(12) United States Patent
Costa et al.

(10) Patent No.: US 9,652,775 B2
(45) Date of Patent: May 16, 2017

(54) SYSTEM, METHOD, PROCEDURE AND COMPONENTS FOR PREPARING AN ARTICLE FOR AUTHENTICATION AND TRACKING

(71) Applicants: Pasquale Vincent Costa, Concord, MA (US); Ernest George Henrichon, Jr., Bedford, NH (US); Curtis William Howes, Georgetown, DE (US); Eric Paul Johanson, Sandown, NH (US)

(72) Inventors: Pasquale Vincent Costa, Concord, MA (US); Ernest George Henrichon, Jr., Bedford, NH (US); Curtis William Howes, Georgetown, DE (US); Eric Paul Johanson, Sandown, NH (US)

( * ) Notice: Subject to any disclaimer, the term of this patent is extended or adjusted under 35 U.S.C. 154(b) by 0 days.

(21) Appl. No.: 13/815,871

(22) Filed: Mar. 15, 2013

(65) Prior Publication Data
US 2014/0263604 A1 Sep. 18, 2014

(51) Int. Cl.
G06F 17/00 (2006.01)
G06Q 30/02 (2012.01)

(52) U.S. Cl.
CPC .................................. G06Q 30/02 (2013.01)

(58) Field of Classification Search
USPC ............................ 235/375, 487, 385, 462.01
See application file for complete search history.

(56) References Cited

U.S. PATENT DOCUMENTS

| | | | |
|---|---|---|---|
| 7,204,421 B2* | 4/2007 | Austin | 235/462.01 |
| 2003/0141358 A1* | 7/2003 | Hudson et al. | 235/375 |
| 2008/0011843 A1* | 1/2008 | Barenburg et al. | 235/385 |
| 2010/0327060 A1* | 12/2010 | Moran et al. | 235/440 |
| 2011/0204144 A1* | 8/2011 | Waugh et al. | 235/385 |
| 2012/0175412 A1* | 7/2012 | Grabiner et al. | 235/375 |
| 2012/0286029 A1* | 11/2012 | Chava et al. | 235/375 |
| 2013/0191233 A1* | 7/2013 | Atkinson et al. | 705/21 |

* cited by examiner

Primary Examiner — Edwyn Labaze
(74) Attorney, Agent, or Firm — Morris I. Pollack

(57) ABSTRACT

Persons and/or business entities (inquirers), interested in acquiring a BRANDED article, or availing themselves of a BRANDED service, upon seeing IDENTIFIER 110 with BRAND 120 of authenticator 54, as carried by the article or its packaging or associated with a service, are enabled to recognize that the BRAND SOURCE of such article(s) or service is authenticatable and the article trackable. By imaging the unique encoded symbology 112, carried by IDENTIFIER 110, and transmitting the image, and/or its decode, to administrator 54 authentication of the BRAND SOURCE and tracking of the article may be accomplished. Authenticator 54, upon receipt of the image, and/or decode, of the encoded symbology 112 carried by the article or service, may query authenticator data base 58 (FIG. 1) and seek a match, from data previously stored in data base 58 for stored data corresponding to the so received decode of the specific encoded symbology carried by the article or service. According to one aspect of this invention all inquiries concerning authentication of BRAND SOURCE are routed to authenticator 54.

29 Claims, 2 Drawing Sheets

SYSTEM, METHOD, PROCEDURE AND COMPONENTS FOR PREPARING AN ARTICLE FOR AUTHENTICATION AND TRACKING

This application is a Continuation-in-part of co-pending patent application Ser. No. 12/927,809 filed on Nov. 24, 2010, which is a Continuation-in-part of application Ser. No. 11/728,794, filed on Mar. 27, 2007 now U.S. Pat. No. 7,852,195 both are assigned to the assignee of this application.

BACKGROUND OF THE INVENTION

Field of Application

This invention relates to authenticating and tracking of articles (products, software and the like); and more particularly, to a system, procedure and components for preparing articles for globally and readily accomplishing such tasks.

Description of the Prior Art

Many entities (parties, corporations, partnerships, individuals, associations, etc.) spend considerable amounts, possibly millions, in advertising and other marketing efforts to create, and to generate, good will in and to themselves and their respective articles (products, services and the like). In some cases, further amounts (here again possibly millions) are often spent in gathering, analyzing and utilizing consumer location, demographic and other data to facilitate developing and marketing the articles (products and/or services).

Consumer location, demographic and other related data and consumer contact is important in developing and marketing of products and services. BRANDS are also important and are used by entities in connection with articles (product or products, or service or services), to help consumers (actual or intended purchasers, and/or users) select the particular product(s) and/or service(s) that are provided by a selected entity that the consumer prefers to be the SOURCE (owner, licensee, provider, manufacturer, wholesaler, retailer, etc) for a particular product, or service. The BRAND thus distinguishes the selected product, or service, from the products, or services, of competitors that the consumer does not desire to be the provider. BRANDS indicate to consumers that a product, or service, comes from a SOURCE, even if the name of the SOURCE is unknown to the consumer. BRANDS also function to indicate quality and reputation, thus creating good will in the proprietor (owner, SOURCE) of the BRAND and BRANDED product and/or service.

A BRAND (often otherwise sometimes referred to as a trademark, or service mark) may comprise any word, name, phrase, symbol, design or device or any combination of words, names, phrases, symbols, designs or devices which identifies and distinguishes the SOURCE (such as the manufacturer, retailer, provider, etc.) of the goods or services of one entity from those of another entity.

BRAND names represent a valuable asset of an entity (the SOURCE of the BRAND), and are often the focus of great efforts undertaken to police the proper and authorized use of such BRAND names. Despite such efforts, successful BRAND names have been wrongfully exploited for years by unscrupulous parties such as illegal manufacturers and resellers of counterfeit and/or stolen and/or diverted products attempting to hood-wink the public into thinking that the goods and/or services emanate from the true SOURCE. High price luxury type goods in particular have been, and continue to be, subjected to widespread counterfeiting, theft and diversion.

The legitimate use of BRANDS (trademarks and service marks) benefits the consuming public as well as the merchant or manufacturer of a product, or provider of a service. For the merchant or manufacturer, each BRAND may serve as an advertising tool, facilitating repeat sales and the successful marketing of new products and services by the BRAND SOURCE. Individual consumers rely on BRANDS to distinguish among competing products, services and BRAND SOURCES, and to represent a certain level of quality they have come to expect when purchasing products or services with which a particular BRAND is used or emanating from a particular BRAND SOURCE. By protecting BRANDS, several broader goals are furthered as well. BRANDS foster competition and the maintenance of quality by securing to the provider (the BRAND SOURCE) the benefits of good reputation. Protecting BRANDS also serves to guard the public from inadvertent or intentional use of confusing or misleading BRANDS.

The actual lost sales and profits, and loss of taxes to governments, attributed to wrongful activities (counterfeiting, theft, diversion, knock-offs, etc.) is but one aspect of the problem. An often more serious result is the damage done to the good name and reputation of the BRAND owner (SOURCE) especially when inferior counterfeited merchandise is sold as genuine. In an effort to counteract the problem, BRAND name owners often aggressively pursue counterfeiters, and introduce programs intended to eliminate or at least reduce such illegal activities. While some programs have met rather limited short term success, the end rewards to the wrongdoers are often so large that the programs themselves have been copied.

The use of serial numbers to track, and hopefully control, product security has proved helpful for vehicles as VIN (Vehicle Identification) Numbers, and also for product warranty purposes. But, serial numbering alone does not seem to be an effective BRAND source authenticator for an inquirer as they do not have a readily observable indicator that authentication and tracking is available to them or ready access to the identifying database. Systems, such as those shown in U.S. Pat. No. 5,521,815 for "Uniform System For Verifying and tracking Articles of Value" and in U.S. Pat. No. 6,076,064 for "Uniform System For Verifying And Tracking The Title of Articles or Objects of Value" are further examples of complex and expensive product security systems that do not indicate to an inquirer that the article is authenticateable and/or trackable or permit ready access to databases, to verify product security and would prove cumbersome to an inquirer and, as such unacceptable.

U.S. Pat. No. 6,099,930 for "Methods and Marking Digital Compact Discs As A Means To Determine its authenticity" utilizes near infrared flurophores; but, requires a protective cover layer which would not only be unacceptably detrimental to the aesthetics of the product but might, as well, be unusable for items of jewelry and the like. U.S. Pat. No. 6,533,180 for "Security Label and Method of Use" also only provides an obtrusive and unacceptable label that must be attached to the product; while U.S. Pat. No. 6,578,112 requires special buttons with a complex and relatively expensive sewing machine to attach the buttons with a relatively complex stitch. In addition none of available systems serve to establish communication between the party seeking authentication of the BRAND and the BRAND SOURCE for purposes of marketing the same and other products and/or services of the BRAND SOURCE and otherwise provide to the BRAND SOURCE information pertinent to the whereabouts and product and other interests, and biographic information, of the party making the inquiry.

SUMMARY OF THE INVENTION

Therefore, it is an object of the invention to provide a new and novel system, method, procedure and components for applying a unique identifier to an article for authenticating, and tracking the article.

It is another object of the invention to provide a new and novel system, method, procedure and components for applying a unique identifier to an article for authenticating the SOURCE of BRANDED articles.

It is another object of the invention to provide a new and novel system, method, procedure and components for applying a unique identifier to an article for BRAND SOURCE authenticating which utilizes a specially and uniquely designed BRAND SOURCE identifier to be visually displayed so as to be easily and obviously located and to readily enable determination of a BRAND SOURCE for the article or service.

It is another object of the invention to provide a new and novel system, method, procedure and components for BRAND SOURCE authentication and tracking which utilizes a specially and uniquely designed BRAND SOURCE unique identifier to be carried by an article so as to be easily and obviously located, especially by a party to verify the BRAND SOURCE and location of an article.

It is another object of the invention to provide a new and novel system, method, procedure and components for BRAND SOURCE authentication and tracking wherein a BRAND SOURCE identifier is uniquely encoded and provided under authority of the BRAND SOURCE to indicate to an inquiring party the authentic and legitimate SOURCE of a BRAND.

It is another object of the invention to provide a new and novel system, method, procedure and components for BRAND SOURCE authentication and tracking wherein a unique identifier may be displayed and queried by use of an electronic device such as a camera of a cell phone, smart phone or other electronic device to verify the BRAND SOURCE and/or location of an article upon which the unique identifier appears.

It is another object of the invention to provide a new and novel system, method, procedure and components for BRAND SOURCE authentication and tracking wherein a unique identifier may be displayed and queried through the use of an electronic device such as a camera of a camera equipped cell phone, smart phone, or the like, to verify, in real time through the device and/or the internet, that a provider of articles and/or services is, in fact, authorized by a BRAND SOURCE to be an AUTHORIZED PROVIDER;

It is another object of this invention to provide a new and novel system, method, procedure and components to authenticate and track an article by applying a unique identifier to an article as the article is created.

It is another object of this invention to provide a new and novel system, method, procedure and components to authenticate and track an article by applying a unique identifier to an article as the article is created wherein the article is a manufactured article.

It is another object of this invention to provide a new and novel system, method, procedure and components to authenticate and track an article by applying a unique identifier to an article as the article is created wherein the article is a program and/or software for computers, smart phones, or the like.

It is another object of this invention to provide a new and novel system, method, procedure and components to authenticate and track an article by applying a unique identifier to an article as the article is created and wherein the unique identifier is queried at least once during creation of the article to verify correspondence of the uique identifier and the article being created.

It is another object of this invention to provide a new and novel system, method, procedure and components to authenticate and track an article by applying a unique identifier to an article as the article is created and wherein the unique identifier is queried more then once and at selected points during creation and packaging of the article to verify correspondence of the uique identifier and the article that has been created is the article being packaged.

It is another object of this invention to provide a new and novel system, method, procedure and components to authenticate and track a multiplicity of articles by applying a unique identifier to each such article as it is being created and wherein each unique identifier is different for each such article.

It is another object of this invention to provide a new and novel system, method, procedure and components to authenticate and track a multiplicity of articles by applying a unique identifier to each such article as it is being created and packaged and wherein each unique identifier is different for each such article and for each such package.

It is another object of this invention to provide a new and novel system, method, procedure and components to identify, authenticate and track an article by applying a unique identifier to an article as the article is created and wherein the unique identifier is different for each article and wherein the unique identifier is provided by a selected supplier and includes a recognizable BRAND of the supplier of the unique identifier and wherein data obtained from the unique identifier is stored in at least a database secured and controlled by the supplier of the unique identifier, and wherein queries of the unique identifier may be responded to by the supplier of the unique identifier.

It is another object of the invention to provide a new and novel system, method, procedure and components for a BRAND SOURCE authentication system wherein the BRAND SOURCE unique identifier may also include or be associated with, or be in proximity to, a BRAND of the BRAND SOURCE unique identifier supplier.

It is another object of the invention to provide a new and novel system, method, procedure and components for a BRAND SOURCE authentication system wherein symbology encoded unique identifiers are supplied in sets to BRAND owners, and/or their designee(s), who would thereafter see to the further use of the unique identifiers.

It is another object of the invention to provide a new and novel system, method, procedure and components for BRAND SOURCE authentication systems wherein symbology encoded, BRAND SOURCE identifiers, each uniquely encoded, and which may, or may not, also be encrypted, to provide authenticity and tracking information, are supplied to BRAND owners, and/or BRAND owners designees who would then see to further use of the unique identifiers.

It is another object of the invention to provide a new and novel system, method, procedure and components for a BRAND SOURCE authentication system wherein symbology encoded unique identifiers are supplied in sets, with each identifier in the set serially numbered, and/or randomly numbered, to the BRAND SOURCE, who would then control their further use.

It is another object of the invention to provide a new and novel system, method, procedure and components for a BRAND SOURCE authentication system which readily identifies BRAND SOURCE may also provide other characteristics and/or information pertinent to the BRANDED product and/or service.

It is another object of the invention to provide a new and novel system, method, procedure and components for a BRAND SOURCE authentication system which has a centralized control and supply of unique identifiers.

It is another object of the invention to provide a new and novel system, method, procedure and components for BRAND SOURCE authentication systems which has a centralized control and supply of unique identifiers and wherein that central control stores the unique identifier information and is the entity to be queried to authenticate the BRAND SOURCE.

It is another object of the invention to provide a new and novel system, method, procedure and components for BRAND SOURCE authentication systems wherein a party, in possession of an article which does not carry a unique identifier, is provided with one or more unique identifiers by the party authorized by the BRAND SOURCE to so supply unique identifiers, applies a unique identifier to the article and communicates the information pertinent to the unique identifier to at least the unique identifier supplier, along with other details of the article.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE INVENTIVE EMBODIMENTS

Figure 1:
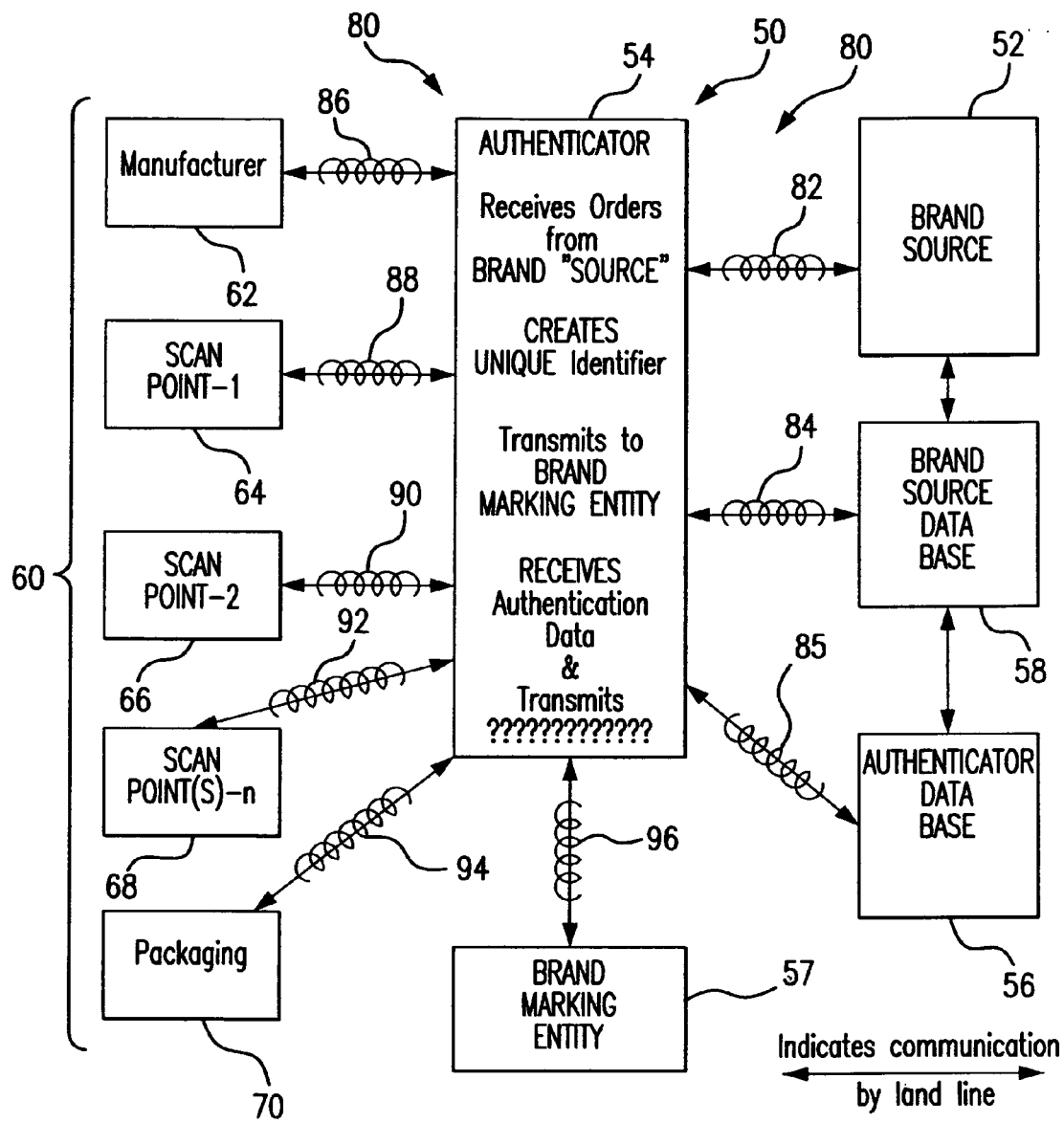
FIG. 1 is a schematic block diagram of a new and novel system, method, procedure and components for a Brand SOURCE authentication and tracking system, showing the application of a unique identifier to an article or articles and incorporating the instant invention.

With reference to FIG. 1 there is generally shown a schematic block and flow diagram for associating the components and participating entities for a BRAND SOURCE authentication and tracking system 50, including: a BRAND SOURCE 52; an AUTHENTICATOR 54; a BRAND SOURCE Database 58; a BRAND MARKING ENTITY 57; an AUTHENTICATOR DATABASE 56; and a group of SELECTED STATIONS 60 involved in the application of a UNIQUE INDICIA to articles during creation of the articles. The group of stations 60 includes manufacturing, packaging and other selected check points, that may be, or are in fact, utilized to assure that data derived from the BRAND UNIQUE INDICIA applied to an article is consistent and is transmitted to the respective DATABASES. Bi-directional communication links 80, such as links 82, 84, 85, 86, 88, 90, 92, 94, and 96, interconnect the various components of system 50.

Articles, as referred to throughout this patent application is intended to include manufactured and otherwise built and/or assembled products, programs, services, computer and other software, CDS, DVDS, films, digital recordings and the like; as well as components, subassemblies and assemblies of same.

The respective Bi-directional communication links 80 may include wired lines, wireless and internet connections, and the like; and most especially camera equipped cell phones, camera equipped smart phones and other camera equipped mobile devices. All such devices should be equipped with, or be otherwise supported by, conventionally available software and a VPN preferably provided by authenticator 54 (Authenticator Virtual Private Network-AVPN).

All of the afore described articles and their components are to be interrelated so that when a camera is enabled to image a BRAND SOURCE UNIQUE IDENTIFIER 110 (FIGS. 2 and 3), associated with the respective article(s) and/or service(s), it may transmit the identifier image to a designated party as will be described, or it may decode a uniquely encoded symbology 112, of unique identifier 110, and transmit the resulting decode to a designated party as will be described in greater detail hereinafter.

Figure 2:
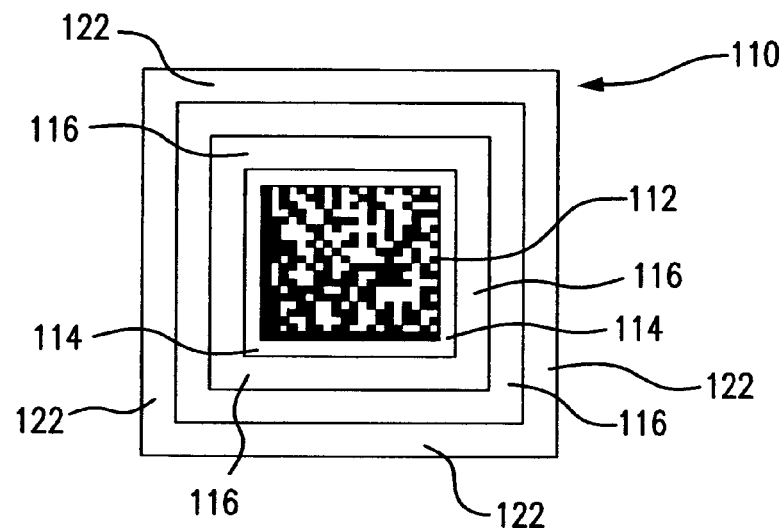
FIG. 2 is a plan view of a new and novel BRAND SOURCE unique identifier, incorporating the instant invention, to be applied to an article according to the system and procedure of FIG. 1, enlarged to better show and describe the portions and components thereof.
Figure 3:
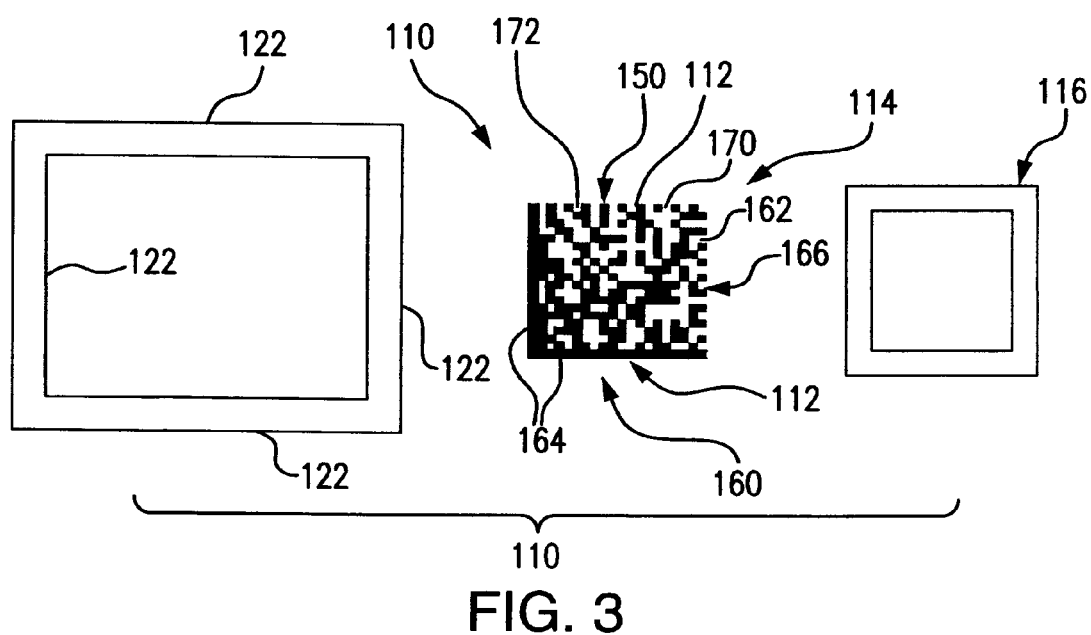
FIG. 3 is a plan view of an alternative embodiment of a new and novel BRAND SOURCE unique identifier, with its components separated, incorporating the instant invention to be applied to an article according to the system and procedure of FIG. 1, and enlarged to better show and describe the portions and components thereof.

With particular reference to FIGS. 2 & 3 there is generally shown a unique BRAND SOURCE identifier 110 (further also referred to as IDENTIFIER 110 and/or UNIQUE IDENTIFIER 110) which includes, but is not necessarily limited to, at least two, but possibly three or more, display portions. A first display portion 114 comprises a unique encoded symbology display portion for displaying encoded symbology 112 pertaining to the article(s) and/or service to be authenticated. A second display portion 116 comprises an authenticator BRAND display portion for displaying a BRAND (not shown) of authenticator 54 that signifies that the BRAND SOURCE of the article(s) and/or service is authenticateable. A third display portion 122 comprises a BRAND SOURCE AND portion and may be optionally utilized when and if so desired by the BRAND SOURCE 52 to display the BRAND (not shown) to be authenticated.

Encoded symbology 112 is preferably of the 2-D, Data Matrix conventionally available type. However, encoded symbology 112 incorporating the instant invention is specially and uniquely formatted. Some characteristics of unique encoded symbology 112 are the same as for a conventional Data Matrix symbology; but the unique encoding of symbology 112 facilitates relatively rapid and error free coding, decoding and transmission and use thereof in BRAND SOURCE authentication. As an alternative symbology for IDENTIFIER 110 conventional Data Matrix encoding may be utilized.

Encode symbology 112 is of conventional Data Matrix type with the matrix code format 150 (FIG. 3) wherein black data elements (cells) usually represent a binary "1" and white data elements (cells) usually represent a binary "0"; but the opposite is also possible. When these binary values are used together in specific sequences, they represent alphanumeric characters. The basic elements of an encoded matrix symbol 160 are shown, for example, as a square, but may also be rectangular, circular or of other configurations.

Symbol 150 includes a data storage field 162 disposed between solid borders 164 and broken borders 166, or borders of other configurations. to facilitate location and decoding of the encoded data. White data cells 170 and black data cells 172 are usually arranged within data storage field 162, through known conventional methods, to provide encoded data, information and the like. In fact conventional Data Matrix symbols have been placed in the public domain and have been recommended by the American National Standards Institute (ANSI) for use in direct part marking. Alternatively encoded Data Matrix symbols are applied to a carrier strip, such as a pressure sensitive label, which could then be applied to an item. Data Matrix symbols may also be applied by direct part marking.

The BRANDS of authenticator 54 and of BRAND SOURCE 52 to be authenticated and which are to be carried and displayed or otherwise associated with IDENTIFIER 110 display portions 116 and 122 respectively are so carried and displayed unencoded and user visually recognizable; while unique encoded symbology 112, is allocated to display portion 114 to carried by and displayed and/or otherwise associated with IDENTIFIER 110 so as to be imaged, decoded and utilized to authenticate the BRAND SOURCE. It should be understood that while the two or possibly three portions of IDENTIFIER 110 are preferably arranged as shown in FIG. 2 that such portions can be otherwise arranged; such as by being horizontally adjacent as shown in FIG. 3; vertically arranged (not shown) or arranged in as many dispositions as BRAND SOURCE 52 and authenticator 54 agree upon or as possibly required for the article(s) and/or service(s) to be authenticated.

In addition that while encoded symbology 112 has been shown surrounded by, or imbedded within the BRAND of authenticator 54 it may be otherwise displayed. It should be further understood that while a Data Matrix type symbology has been shown and described as the preferred encoded symbology that other encoded symbologies may be utilized as long as such other symbologies are uniquely generated under criteria as that shown and explained for encoded symbology 112. Such encoded symbologies may furthermore be not only encoded but they may just as well be encrypted, or just encrypted.

BRAND SOURCE UNIQUE IDENTIFIER 110 (FIGS. 2 & 3) is to be provided, by and/or under, authority of authenticator 54 (FIG. 1), as will be hereinafter described in greater detail. When so provided the content of the IDENTIFIER can be arranged, as agreed to by the BRAND SOURCE 52 and AUTHENTICATOR 54, in any convenient manner, as long as that content includes at least the pertinent encoded symbology and a BRAND of the UNIQUE INDICIA AUTHENTICATOR 54 (as described in further detail in the patent and co-pending applications. The content for the UNIQUE IDENTIFIER 110 can be: printed; embroidered; or otherwise applied to a carrier: of paper; card stock; plastic; a fabric of cloth, plastic, fabric or a combination thereof; directly upon a tag or a substrait and then affixed to such a carrier; or directly upon a readily viewable part of the article, a decal, or an electronic and/or other types of listings and/or by any other media. Encoded symbology 112 is preferably applied to the respective tag(s) (not shown) by, or under control of, authenticator 54 and may be so applied by direct part marking of tag(s); or by affixing labels to such tags, or by etching (laser or otherwise) directly upon a readily viewable surface of the article. Direct part marking of tags and/or labels may include the encoded symbology 112 and be so applied as by laser etching or the like. Such applied symbologies may also be encrypted.

When a BRAND SOURCE, such as BRAND SOURCE 52 (FIG. 1), intends to have the particular BRAND on their BRANDED articles prepared for BRAND SOURCE authentication and/or tracking they, or a party authorized by the BRAND SOURCE to do so, contact Authenticator 54, possibly by secure transmission and encrypted, and requests Authenticator 54 to prepare and otherwise issue unique, authenticateable, identifiers 110 pertinent to the BRAND SOURCE 52 and the article(s) to be BRANDED, as described hereinabove. Authenticator 54, following instructions from, recommendations to and agreement with, BRAND SOURCE 52 will have a set of UNIQUE IDENTIFIERS 110 prepared and provided to a BRAND MARKING ENTITY, such as ENTITY 56. Identifiers 110, so prepared, will include at least the unique encoded symbology 112 pertinent to the BRAND SOURCE of the BRAND to be applied, and a visually recognizable BRAND of Authenticator 54 and may, or may not, include other encoded data provided by BRAND SOURCE 52. Such identifiers 110 may also include a visually recognizable showing of the BRAND that is to be authenticated. Such UNIQUE IDENTIFIERS 110 are to be prepared as described herein above are applied on or with the respective article(s). The BRAND SOURCE 52 should also advise AUTHENTICATOR 54 the number of articles that are to have a UNIQUE IDENTIFIER applied thereto. The set of IDENTIFIERS may also include some extra IDENTIFIERS just in case and each such IDENTIFIER in the set will be numbered differently from every other IDENTIFIERS; especially every other IDENTIFIER in the set. The detail data of each such supplier in the set is to be scanned ad transmitted to AUTHENTICATOR DATABASE 56 to indicate that such IDENTIFIERS are in existence and have been transmitted for use. Data indicating that some of such IDENTIFIERS, in fact, have not been so used is also entered into database 54 and the respective IDENTIFIERS secured until used or destroyed.

Data derived from the unique encoded symbology so provided is stored by, or for, authenticator 54 in the Authenticator Database 58 at the time such unique identifiers 110 are so prepared. The veracity and secrecy of the encoded identifier data 112 is significantly enhanced and protected if authenticator 54 is preferably an independent third party and the data once stored: is not to be erased or modified but only indicated as not used; and can only be accessed by, or under control of, authenticator 54 for BRAND SOURCE authentication and/or tracking purposes, as will be explained in greater detail hereinafter. It is possible, however, for BRAND SOURCE 52 to either be able to store BRAND SOURCE and other data in its own data storage facility(s) and or to control access thereto to store such data and/or to access such data for authentication and tracking purposes.

During the subsequent creation of articles (as by manufacturing, assembling, building and the like, and/or by the generation of programs, software, disks, films, etc.) a respective UNIQUE IDENTIFIER 110 is to be applied to the article. How the UIQUE INDICIA 110 is to be applied will depend upon its physical characteristics, such as size, shape, configuration etc. and whether the UNIQUE IDENTIFIER 110 is provided on a substrate of fabric, paper, plastic, film, etc or is to be directly applied to a particular surface of the article or on a hang tag like carrier to be attached to the article. Creation of UNIQUE IDENTIFIER 110 and its physical characteristics may be as described in the patent and patent application.

Tracking of an article during its creation is possible due to and after its UNIQUE IDENTIFIER 110 has been applied to at least a component of the article. Data collection, by conventionally available Secure Data Collection Units, is to be accomplished, as by scanning as shown at 60 (FIG. 1), of the UNIQUE IDENTIFIER and transmitting the collected data to AUTHENTICATOR DATABASE 56. by wire, Wi-Fi, or otherwise via the internet. The collected data may also be buffered before such transmission; and thereafter transmitted by available means, When a number of articles, each having its own UNIQUE IDENTIFIER applied thereto, are to be packaged together a separately encoded UNIQUE IDENTIFIER is applied to the package; with each such package UNIQUE IDENTIFIER being different and created as described for UNIQUE IDENTIFIER 110. The UNIQUE IDENTIFIERS for each article to be placed in such a package are scanned as well as the package UNIQUE IDENTIFIER and the scanned data thereafter transmitted and stored in AUTHENTICATOR DATABASE 56; and if desired also in BRAND SOURCE DATABASE 58. If multiple packages are, in turn, to be containerized then the data from the UNIQUE IDENTIFIERS of each such package are scanned and whatever ID is provided for the container is also scanned and the resulting set of data stored for future tracking.

Sometimes articles are inventoried, and/or placed in use, without having identifiers, such as UNIQUE IDENTIFIERS 110, attached thereto or associated therewith. Either by a concerted effort or when a party, such as a service person, attends to such article a SPECIAL UNIQUE IDENTIFIER, may be applied to such article and also, if so desired, assemblies, sub-assemblies and components thereof. In such instances SPECIAL UNIQUE IDENTIFIERS, each with encoded data different from that of each other SPECIAL UNIQUE IDENTIFIER, may be grouped in special sets to be carried by, or otherwise available, to persons attending to such articles. SPECIAL UNIQUE IDENTIFIERS may then be attached to the article and/or particular components, sub-assemblies and assemblies thereof, Data carried by the SPECIAL UNIQUE IDENTIFIER is scanned or otherwise read and along with other pertinent information transmitted to a data storage facility. The availability of such data can be used to track the article(s) or otherwise for other purposes.

Persons and/or business entities (inquirers), interested in acquiring a BRANDED article, or availing themselves of a BRANDED service, upon seeing IDENTIFIER 110 with BRAND 120 of authenticator 54 will recognize that the BRAND SOURCE of such article(s) or service is authenticatable and the article trackable. All that needs to be done is to image the unique encoded symbology 112, carried by IDENTIFIER 110, and transmit the image and/or its decode, to administrator 54 for authentication of the BRAND SOURCE and tracking of the article. The imager to be so utilized needs to be camera equipped and otherwise equipped to image and decode 2D Data Matrix type encoded, and/or possibly encrypted, symbology and to transmit the image and/or encoded symbology and possibly a decode of the encoded symbology to authenticator 54 by an available Authenticator Virtual Private Network (AVPN) previously supplied for the imager by authenticator 54. Authenticator 54, upon receipt of the image, and/or decode, of the encoded symbology 112 carried by the article or service, can then query authenticator data base 58 (FIG. 1) and match, from data previously stored in data base 58, if there is stored data corresponding to the so received decode of the specific encoded symbology carried by the article or service. Authenticator 54 furthermore may also transmit the decode of the encoded symbology to BRAND SOURCE 52 for comparison with data stored in the BRAND SOURCE data storage facility 56. If there is a match of the decode then BRAND SOURCE 52 so advises authenticator 54 and authenticator 54 transmits an authentication of the BRAND SOURCE back to the person or business entity that transmitted the inquiry. If there is no match BRAND SOURCE 52 may also so advise authenticator 54 and authenticator 54 either advises those parties that there is no match and/or that the article is counterfeit. It should be noted that according to this invention all inquiries concerning authentication of BRAND SOURCE must be routed to authenticator 54.

What is claimed is:

1. A system for authenticating and tracking of articles and services by an end user; comprising,
    a). a unique identifier, of a size and configuration to be associated with an article or a service, to be as requested by the BRAND SOURCE and provided to the end user by an authenticator, including:
        i). at least a human observable surface portion; and
        ii). an encoded symbology portion;
        iii). said requested encoded symbology to include, at least, identifiers pertinent to the BRAND SOURCE and the article(s) to be BRANDED;
        iv). said requested encoded symbology to be stored so as not to be erased or modified;
    b), an authenticator for providing said unique identifier with said requested encoded symbology placed upon said encoded symbology portion of said unique identifier;
    c). said unique identifier displaying, upon said observable surface portion, a human recognizable brand of said authenticator;
    d). data entry, imaging, decoding, transmitting, and storing devices for capturing, collecting, transmitting and storing said requested and other encoded symbology;
        i). for entering and storing with said authenticator said requested and other encoded symbology; and
        ii). for entering and storing location data for an article or service after a unique identifier has been attached to or otherwise associated with an article or service; and to store said location data;
        iii). and to correlate said stored location data with said data of said encoded symbology to facilitate tracking and/or authentication of an article or service.

2. The system for authenticating and tracking of claim 1 wherein there are a number of articles or services with a unique identifier for each of said articles and/or services and said encoded symbology includes a different identifying number for each of said unique identifiers.

3. The system for authenticating and tracking of claim 2; wherein said authenticator is to provide said unique identifiers to an end user upon a request by said end user.

4. The system for authenticating and tracking of claim 3; wherein a human recognizable brand of said end user for the articles and/or services for the respective unique identifiers is also to be displayed upon said observable surface portion of said unique identifiers.

5. The system for authenticating and tracking of claim 4; wherein said human recognizable brand of said end user is also to be displayed in relatively closeproximity to said encoded symbology portion of said unique identifier but spaced from said portion where said brand of said authenticator is to be displayed.

6. The system for authenticating and tracking of claim 1; wherein said human observable portion of said unique identifier is in relatively close proximity to said encoded symbology portion of said unique identifier.

7. The system for authenticating and tracking of claim 1 wherein said unique identifier may be displayed and queried by use of an electronic device such as a camera of a cell phone, smart phone or other electronic device for verification of a BRAND SOURCE and/or location of an article upon which the unique identifier appears.

8. The system for authenticating and tracking of claim 7; wherein said verification is to be accomplished, in real time through the device and/or the internet, that a provider of articles and/or services is, in fact, authorized by a BRAND SOURCE to be an AUTHORIZED PROVIDER.

9. The system for authenticating and tracking of claim 1; wherein said requested unique identifier is applied to an article or service while such are being created.

10. The system for authenticating and tracking of claim 9; wherein the article is a manufactured article.

11. The system for authenticating and tracking of claim 1; wherein the article is a program and/or software for computers, smart phones, or the like.

12. The system for authenticating and tracking of claim 1; wherein the unique identifier is queried at least once during creation of the article to verify correspondence of the uique identifier and the article being created.

13. The system for authenticating and tracking of claim 12; wherein the unique identifier is queried more than once and at selected points during creation and packaging of the article to verify correspondence of the unique identifier and the article that has been\created is the article being packaged.

14. The system for authenticating and tracking of claim 1; wherein a multiplicity of articles each have applied thereto a unique identifier as it is being created and wherein each unique identifier is different for each such article.

15. The system for authenticating and tracking of claim 14; wherein a unique identifier is applied to each such article as it is being created and packaged and wherein each unique identifier is different for each such article and for each such package.

16. The system for authenticating and tracking of claim 1 wherein the Unique identifier is different for each article and wherein the unique identifier is provided by a selected supplier and includes a recognizable BRAND of the supplier of the unique identifier and wherein data obtained from the unique identifier is stored in at least a database secured and controlled by the supplier of the unique identifier, and wherein queries of the unique identifier may be responded to by the supplier of the unique identifier.

17. The system for authenticating and tracking of claim 1 wherein the symbology encoded unique identifiers are supplied in sets to BRAND owners,and/or their designee(s), who would thereafter see to the further use of the unique identifiers.

18. The system for authenticating and tracking of claim 1; wherein BRAND SOURCE identifiers, each uniquely encoded, and which may, or may not, also be encrypted, to provide authenticity and tracking information, are supplied to BRAND owners, and/or BRAND owners designees who would then see to further use of the unique identifiers.

19. The system for authenticating and tracking of claim 1; wherein said symbology encoded unique identifiers are supplied in sets, with each identifier in the set serially numbered, and/or randomly numbered, to the BRAND SOURCE, who would then control their further use.

20. The system for authenticating and tracking of claim 1 wherein said system readily identifies BRAND SOURCE and may also provide other characteristics and/or information pertinent to the BRANDED product and/or service.

21. The system for authenticating and tracking of claim 1 wherein said BRAND SOURCE authentication system includes a centralized control and supply of unique identifiers.

22. The system for authenticating and tracking of claim 1 wherein said central control stores the unique identifier information and is the entity to be queried to authenticate the BRAND SOURCE.

23. The system for authenticating and tracking of claim 1; wherein a party, in possession of an article which does not carry a unique identifier, is provided with one or more unique identifiers by the party authorized by the BRAND SOURCE to so supply unique identifiers, applies a unique identifier to the article and communicates the information pertinent to the unique identifier to at least the unique identifier supplier, along with other details of the article.

24. A unique identifier of a size and configuration to be associated with an article or a service generated by an authenticator for an end user, including:
   a). at least a first human observable surface portion; and
   b). an encoded symbology portion;
   c). encoded symbology displayed upon said encoded symbology portion of said unique identifier;
   d). at least a portion of said encoded symbology being applied so as to not be erasable or modified;
   e). at least a first human recognizable brand of the authenticator displayed upon said observable surface portion;
   f). said human observable surface portion and said encoded symbology portion being displayed in relatively close proximity to each other.

25. The unique identifier of claim 24 wherein the are two spaced human observable portions spaced from each other with each in relatively close proximity to said encoded symbology portion of said unique identifier.

26. The unique identifier of claim 24 wherein said Unique identifier is to be applied directly upon an article or otherwise associated with a service.

27. The unique identifier of claim 24 wherein said Unique identifier is to be applied directly to an article or otherwise associated with a service.

28. The unique identifier of claim 24 wherein said Unique identifier is applied to a carrier or substrate before being attached to an article or associated with a service.

29. The unique identifier of claim 24 wherein said Unique identifier is applied to a carrier or substrate before being attached to an article or associated with a service.

* * * * *